United States Patent
Okazaki

(10) Patent No.: US 7,509,424 B2
(45) Date of Patent: Mar. 24, 2009

(54) LOAD-BALANCING DEVICE AND COMPUTER-READABLE RECORDING MEDIUM IN WHICH LOAD-BALANCING PROGRAM IS RECORDED

(75) Inventor: Kotaro Okazaki, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 525 days.

(21) Appl. No.: 11/439,644

(22) Filed: May 24, 2006

(65) Prior Publication Data

US 2007/0192492 A1    Aug. 16, 2007

(30) Foreign Application Priority Data

Feb. 14, 2006    (JP)    ............................. 2006-036354

(51) Int. Cl.
*G06F 15/173* (2006.01)
*G06F 9/46* (2006.01)

(52) U.S. Cl. .................. 709/226; 709/244; 718/105

(58) Field of Classification Search .................. None
See application file for complete search history.

(56) References Cited

U.S. PATENT DOCUMENTS

| | | | | |
|---|---|---|---|---|
| 6,473,802 | B2 * | 10/2002 | Masters | 709/229 |
| 7,013,322 | B2 * | 3/2006 | Lahr | 709/201 |
| 7,143,169 | B1 * | 11/2006 | Champagne et al. | 709/226 |
| 7,359,942 | B2 * | 4/2008 | Mizushima et al. | 709/206 |
| 2006/0242300 | A1 * | 10/2006 | Yumoto et al. | 709/226 |

FOREIGN PATENT DOCUMENTS

| | | |
|---|---|---|
| JP | 2002-517861 | 6/2002 |
| JP | 2002-335268 | 11/2002 |
| JP | 2004-178286 | 6/2004 |
| JP | 2004-350188 | 12/2004 |
| WO | WO 99/64967 | 12/1999 |

OTHER PUBLICATIONS

Zhou, Songnian "A Trace-Driven Simulation Study of Dynamic Load Balancing," Sep. 1988, IEEE, vol. 14, Issue 9, pp. 1-15.*

* cited by examiner

*Primary Examiner*—Patrice Winder
*Assistant Examiner*—Azizul Choudhury
(74) *Attorney, Agent, or Firm*—Greer, Burns & Crain, Ltd.

(57) ABSTRACT

A load-balancing device having a specification-information insertion unit, a specification-information detection unit, and a destination determination unit. When a response message does not contain specification information specifying a destination server, the specification-information insertion unit detects the source server of the response message as the destination server, and inserts into the response message specification information specifying the destination server. A client stores specification information specifying a destination server, and inserts the specification information in a request message when it is necessary to guarantee the uniqueness. When the load-balancing device receives a request message from the client, the specification-information detection unit detects whether or not specification information is inserted in the request message. When specification information is inserted in the request message, the destination determination unit determines the destination server on the basis of the second specification-information inserted in the request message, and sends the request message to the destination server.

5 Claims, 9 Drawing Sheets

LOAD-BALANCING DEVICE AND COMPUTER-READABLE RECORDING MEDIUM IN WHICH LOAD-BALANCING PROGRAM IS RECORDED

CROSS-REFERENCE TO RELATED APPLICATIONS

This application is based upon and claims the benefits of priority from the prior Japanese Patent Application No. 2006-036354, filed on Feb. 14, 2006, the entire contents of which are incorporated herein by reference.

BACKGROUND OF THE INVENTION

1) Field of the Invention

The present invention relates to a load-balancing device and a computer-readable recording medium in which a load-balancing program is recorded, where the load-balancing device and the load-balancing program distribute request messages to servers in such a manner that loads imposed on the servers are balanced, and request messages related to each other are assigned to an identical one of the servers for guaranteeing the uniqueness.

2) Description of the Related Art

Conventionally, the load-balancing technology is known as an essential element which is indispensable for constructing a reliable client-server system. FIG. 8 is a diagram illustrating an example of a configuration of a client-server system having a conventional load-balancing device.

In the client-server system of FIG. 8, a load-balancing device 910 is arranged between a server group 930 which performs processing for predetermined services and a client group (users' devices) 940 which sends request messages (which may be hereinafter referred to as "requests") toward the server group 930 at arbitrary timings. For example, when a request directed to a virtual address representing the server group 930 is transmitted from a client A (941), the load-balancing device 910 receives the request, selects an optimum destination server from the server group 930, and transfers the request. That is, every time the load-balancing device 910 receives a request from a client, the load-balancing device 910 delivers the request to an optimum server. However, in some cases, requests for some types of services are required to be sent to an identical destination server. For example, in shopping sites, it is necessary that each client be connected to an identical server during a purchasing process for list management of an article to be purchased. For this purpose, the load-balancing device 910 has a session-maintaining function which delivers requests related to each other, to an identical server. The session-maintaining function is also called the uniqueness-guaranteeing function which guarantees the uniqueness of data between each client and each server. Hereinafter, the session-maintaining function is referred to as the uniqueness-guaranteeing function.

The uniqueness-guaranteeing function can be typically realized by techniques using: (1) an IP (Internet Protocol) address of a source of a message (source IP address); (2) a cookie which is set by a server; (3) a cookie which is set by a load-balancing device; or the like.

(1') In the case where the uniqueness-guaranteeing function uses a source IP address, the client is identified by the source IP address, so that requests from an identical client can be delivered to an identical server.

(2') In the case where the uniqueness-guaranteeing function uses a cookie which is set by a server, functions related to the cookie used between a server and a client are utilized. That is, when necessary, the server adds to a response message a cookie unique to a user before sending the response message to the client. At this time, the cookie is set so that the cookie is unlikely to overlap other cookies. For example, the cookie is a character string which is randomly set. The client has a function of adding the above cookie to a request and sending the request when the client is required to access the above server. The load-balancing device utilizes the above functions. That is, the load-balancing device memorizes cookies set by the servers. When a request to which a cookie is attached is sent from a client, the load-balancing device delivers the request to a server which issues the cookie, on the basis of the cookie attached to the request. Alternatively, it is possible to use embedded URL (Uniform Resource Locator) parameters instead of the cookies.

(3') In the case where the uniqueness-guaranteeing function uses a cookie which is set by a load-balancing device, the load-balancing device generates a cookie. For example, when the load-balancing device delivers a request 951 from the client A (941), to the server a (931), the load-balancing device attaches a cookie c1 (953) to a response 952 from the server a (931), and returns the response 952 to the client A (941). Thereafter, when a request to which the cookie c1 (953) is attached is sent from the client A (941), the load-balancing device delivers the request to the server a (931) on the basis of the cookie c1 (953).

In addition, a relay device which employs a technique using a cookie function has been proposed, for example, in Japanese Unexamined Patent Publication No. 2004-178286 (Paragraph Nos. <0092> to <0113> and FIG. 2). When data containing a cookie is transmitted from a server, the above relay device overwrites a portion of the cookie contained in the transmitted data with a server identifier, and sends the data to the client. When data containing a cookie is transmitted from a client, the above relay device determines a destination on the basis of a server identifier included in the cookie which is contained in the data transmitted from the client.

However, in the conventional load-balancing processing, sometimes the uniqueness cannot be guaranteed according to the system configuration or the service type as indicated below.

(1") In the case where the uniqueness-guaranteeing function uses a source IP address, usually each client has an identical IP address. However, in some cases where a proxy exists on the client side, the source IP address of an identical client can be dynamically changed. That is, in some cases, the uniqueness cannot be guaranteed even in a single service.

(2") In the case where the uniqueness-guaranteeing function uses a cookie which is set by a server, servers independently set a cookie for each application corresponding to an individual service. Therefore, the uniqueness is guaranteed in each service. However, it is difficult to guarantee the uniqueness across multiple services. Thus, in order to guarantee the uniqueness, for example, it is necessary to perform processing for integrating the multiple services into a single service, or making multiple service applications cooperate with each other. Nevertheless, in order to perform such processing, it is necessary to develop a new application, so that a great amount of labor is required.

(3") In the case where the uniqueness-guaranteeing function uses a cookie which is set by a load-balancing device, it is difficult to guarantee the uniqueness across multiple services as in the above case (2").

FIG. 9 is a diagram illustrating processing for setting a cookie in a conventional load-balancing device. In the following explanations, it is assumed that the services A1 and A2 are related to each other, and are required to be handled by an identical server. When the client A (941) starts the service A1, and transmits toward the server a request for the service A1, the load-balancing system a (910) receives the request, and selects a destination server for the request. For example, when the load-balancing system a (910) delivers the request to the server a (931), the load-balancing system a (910) attaches a cookie c1 to a response to be returned to the client A (941), and sets the information indicating the service A1, the cookie c1, and the destination server "server a" in a management table 911, which is provided in the load-balancing system a (910). Thereafter, the cookie c1 is attached to each request from the client A (941) for the service A1. Therefore, the load-balancing system a (910) can deliver each request from the client A (941), to the server a (931) by referring to the management table 911. However, even if the client A (941) attaches the cookie c1 to a request for the service A2 after the service A2 is started, the load-balancing system a (910) newly determines a destination server, sets a cookie, and performs registration, since the settings for the service A2 are not made in the management table 911. In this case, there is a possibility that the request for the service A2 is delivered to a server other than the server a (931), e.g., the server b (932). Thus, the uniqueness is not guaranteed, and processing similar to the processing required to be performed in the case where the uniqueness-guaranteeing function uses a cookie set by a server is also required to be performed, and it is difficult to perform such processing.

Further, in the case where a plurality of load-balancing devices are provided, the uniqueness is not guaranteed either. For example, when the client A (941) attaches the cookie c1 to a request for the service A1 and transmits the request, and the load-balancing system a (910) receives the request, no problem occurs since the information indicating the service A1 and the cookie c1 are set in the management table 911. However, when the load-balancing system b (920) receives the above request, the load-balancing system b (920) independently determines a destination server, and sets a cookie, since the settings for the service A1 are not made in the management table 921. Therefore, the load-balancing system b (920) can deliver the above request to the server b (932), sets a cookie c3, and returns to the client A (941) a result to which the cookie c3 is attached, so that the uniqueness is not guaranteed. In this case, if only one load-balancing device is used, or a management table is shared by the plurality of load-balancing devices, the uniqueness is guaranteed. However, such countermeasures are not realistic.

Furthermore, similar problems to the above also occur in the case where the uniqueness-guaranteeing function uses a cookie which is set by a server, or the technique using a cookie as disclosed in Japanese Unexamined Patent Publication No. 2004-178286 is used.

As described above, according to the conventional load-balancing processing, it is difficult to guarantee the uniqueness when more than one load-balancing device exists, or when more than one service is required to be handled by an identical server.

SUMMARY OF THE INVENTION

The present invention is made in view of the above problems, and the object of the present invention is to provide a load-balancing device and a computer-readable recording medium in which a load-balancing program is recorded, where the load-balancing device and the load-balancing program can guarantee the uniqueness when necessary, regardless of the system configuration or service type.

In order to accomplish the above object, according to a first aspect of the present invention, a load-balancing device for distributing request messages from clients among servers so as to balance loads imposed on the servers, and delivering ones of the request messages related to each other to an identical one of the servers so as to guarantee the uniqueness is provided. The load-balancing device comprises: a first specification-information detection unit which detects whether or not first specification information uniquely specifying a first destination server of a first request message sent from one of the clients to one of the servers is inserted in a predetermined area, other than a source-address area, of a response message responding to the first request message, when the load-balancing device receives the response message from the one of the servers; a specification-information insertion unit which detects a source server of the response message, designates the source server as the first destination server, generates second specification information uniquely specifying the first destination server, inserts the second specification information into the response message, and sends the response message to the one of the clients, when the first specification-information detection unit detects that the first specification information is not inserted in the first response message; a second specification-information detection unit which detects whether or not third specification information uniquely specifying a second destination server of a second request message is inserted in the second request message when the load-balancing device receives the second request message from the one of the clients, where the one of the clients stores the first or second specification information inserted in the response message, and inserts the third specification information in the second request message when it is necessary to guarantee the uniqueness; and a destination determination unit which determines the second destination server of the second request message in accordance with a predetermined rule when the second specification-information detection unit detects that the third specification information is not inserted in the second request message, determines the second destination server on the basis of the third specification information when the second specification-information detection unit detects that the third specification information is inserted in the second request message, and sends the second request message to the second destination server.

In addition, in order to accomplish the aforementioned object, according to a second aspect of the present invention, a computer-readable recording medium in which a load-balancing program is recorded is provided. The load-balancing program arranged to make a computer realize the load-balancing device according to the first aspect of the present invention when the load-balancing program is executed by the computer.

The above and other objects, features and advantages of the present invention will become apparent from the following description when taken in conjunction with the accompanying drawings which illustrate preferred embodiment of the present invention by way of example.

DESCRIPTION OF THE PREFERRED EMBODIMENTS

A preferred embodiment of the present invention will be explained below with reference to the accompanying drawings, wherein like reference numbers refer to like elements throughout. First, an outline of the present invention which is realized in the embodiment is indicated, and thereafter details of the embodiment are explained.

Outline of the Present Invention

Figure 1:
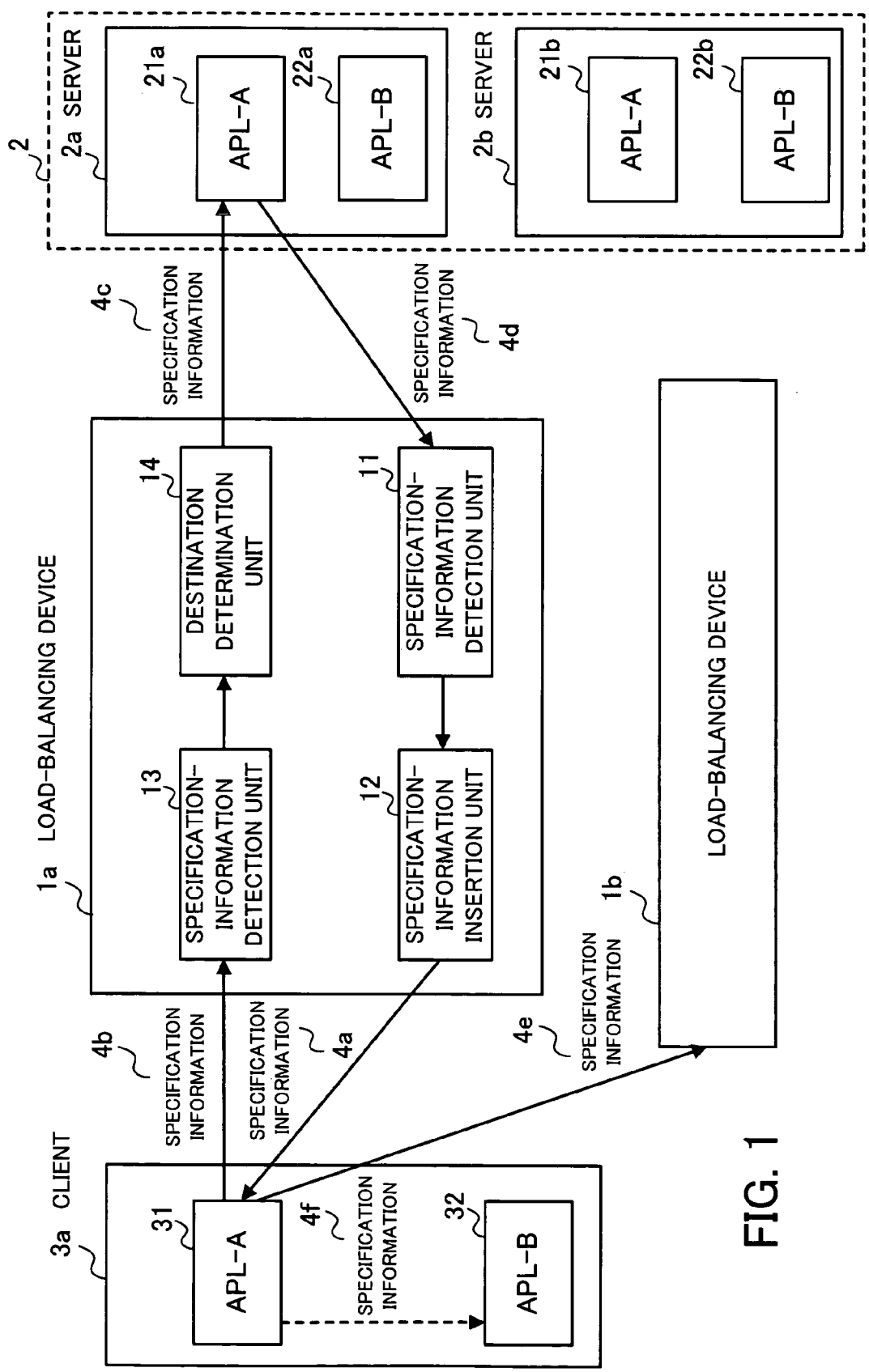
FIG. 1 is a conceptual diagram illustrating the present invention which is realized in an embodiment.

FIG. 1 is a conceptual diagram illustrating the present invention which is realized in the embodiment. The load-balancing devices 1a and 1b according to the present invention are arranged between a client 3a and a server group 2.

The server group 2 includes servers 2a and 2b which perform distributed processing for predetermined services. The server 2a performs server-side processing 21a in accordance with the application A (APL-A) and server-side processing 22a in accordance with the application B (APL-B). The server 2b also performs server-side processing 21b in accordance with the application A (APL-A) and server-side processing 22b in accordance with the application B (APL-B). Therefore, whichever of the servers 2a and 2b each request is delivered to, similar processing is performed. Although two servers are arranged in the example of FIG. 1, the number of servers is not limited to two. In order to guarantee the uniqueness between the client 3a and each of the servers 2a and 2b, each of the servers 2a and 2b inserts, into a predetermined area of a response message, specification information inserted in a predetermined area of a request message received from the load-balancing device 1a or 1b, as it is, and then transmits the response message to the load-balancing device 1a or 1b.

The client 3a performs client-side processing 31 for the service A1 (APL-A) and client-side processing 32 for the service A2 (APL-B). In order to guarantee the uniqueness between the servers 2a and 2b, the client 3a memorizes in a storage the specification information which is inserted in the predetermined area of the response message received from the load-balancing device 1a or 1b. When it is necessary to guarantee the uniqueness, the client 3a inserts the specification information into a predetermined area of a request message to be sent to the server 2a or 2b, and sends the request message to the load-balancing device 1a or 1b. Although only one client is illustrated in the example of FIG. 1, in practice, more than one client is connected.

In FIG. 1, the above specification information is information for enabling unique specification of a destination server which is designated as a destination of a request message by the load-balancing device 1a or 1b. For example, the specification information is information which can be converted into a real address of the destination server. Therefore, it is possible to determine the destination server on the basis of only the specification information, and it is unnecessary to provide in the load-balancing device 1a or 1b a management table for managing destinations. Although the specification information is inserted in the different messages and transferred through different paths (which are respectively indicated by 4a, 4b, 4c, 4d, 4e, and 4f in FIG. 1), the specification information in the different messages are identical. Specifically, the specification information 4a is inserted in a response message sent from the load-balancing device 1a to the client 3a, the specification information 4b is inserted in a request message which is sent from the client 3a and received by the load-balancing device 1a, the specification information 4c is inserted in a request message sent from the load-balancing device 1a to the server 2a, the specification information 4d is inserted in a response message sent from the server 2a to the load-balancing device 1a, the specification information 4e is inserted in a request message sent from the client 3a and received by the load-balancing device 1b, and the specification information 4f is passed from the application (APL-A) 31 to the application (APL-B) 32.

The load-balancing device 1a comprises a first specification-information detection unit 11, a specification-information insertion unit 12, a second specification-information detection unit 13, and a destination determination unit 14. The load-balancing device 1b is also similarly constructed.

The first specification-information detection unit 11 receives a response message responding to a request message sent from the client 3a to the server 2a or 2b, and detects whether or not specification information is inserted in a predetermined area of the response message other than a source-address area. Although the load-balancing device 1a can determine the source server of the response message (which is a destination server when the source server of the response message is so designated) on the basis of the source-address area of the response message, the source-address area is rewritten when each message is transferred between the client 3a and the server 2a. Therefore, it is necessary to reserve the area other than the source-address area. As mentioned before, the specification information is information for enabling unique specification of a destination server as a destination of a request message sent from the client 3a, and is inserted in the predetermined area of the response message. It is possible to arrange the predetermined area for inserting the specification information at an arbitrary position of the header portion or the data portion of the response message as long as consistency between the load-balancing devices 1a and 1b and the servers 2a and 2b is ensured. The result of the detection and the response message are passed to the specification-information insertion unit 12.

The specification-information insertion unit 12 determines, on the basis of the result of the detection by the specification-information detection unit 11, whether or not the specification information is inserted in the response message. When the specification information is inserted in the response message, the specification-information insertion unit 12 sends to the client 3a the response message as it is. When the specification information is not inserted in the response message, the specification-information insertion unit 12 detects the source server of the response message, and designates the source server as the destination server. Then, the specification-information insertion unit 12 generates specification information 4a referring to the source server designated as the destination server, inserts the generated specification information 4a into the predetermined area of the response message to be sent to the client 3a, and sends the response message to the client 3a. The source server can be detected by referring to information generated when the destination determination unit 14 determines the destination, or by referring to the source address of the received response message in the case where the specification information based on a real address is generated.

The second specification-information detection unit 13 acquires the request message sent from the client 3a, detects whether or not specification information 4b is inserted in the request message, and passes the result of the detection and the request message to the destination determination unit 14.

The destination determination unit 14 determines, on the basis of the above result of the detection passed from the second specification-information detection unit 13, whether or not the specification information 4b is inserted in the request message. When the specification information 4b is not inserted in the request message, the destination determination unit 14 determines a destination of the request message in accordance with a predetermined rule. For example, an optimum destination server is determined in a round-robin manner or the like. Then, the destination determination unit 14 sends the request message to the determined destination server. When the specification information 4b is inserted in the request message, the destination determination unit 14 determines the destination server specified by the specification information 4b to be a destination, and sends the request message to the determined destination server. Since the destination server can be determined on the basis of the specification information 4b inserted in the received request message, it is possible to determine the server even when the specification information is set by a device other than the load-balancing device 1a, e.g., the load-balancing device 1b.

The functions of the respective units 11 to 14 in the load-balancing device 1a are realized when a computer executes a load-balancing program.

The operations of the load-balancing device 1a constructed as above are explained below.

In predetermined processing executed in accordance with the application (APL-A) 31, the client 3a sends a request message to the server group 2. At this time, the destination address is a virtual server address representing the servers 2a and 2b. The request message which is first transmitted from the client 3a does not contain specification information. When the load-balancing device 1a receives the request message from the client 3a, the second specification-information detection unit 13 detects whether or not specification information is inserted in the received request message. Since no specification information is inserted in the request message at this time, the destination determination unit 14 determines the destination of the request message in accordance with a predetermined rule, e.g., in a round-robin manner, and sends the request message to the determined destination. In this explanation, it is assumed that the server 2a is selected as the destination of the first request message (which does not contain specification information), and the first request message is sent to the server 2a.

When the server 2a receives the request message from the client 3a which is delivered by the load-balancing device 1a, the application (APL-A) 21a in the server 2a generates a response message responding to the request message, and sends the response message to the load-balancing device 1a. At this time, no specification information is inserted in the response message.

When the load-balancing device 1a receives the response message from the server 2a, the first specification-information detection unit 11 detects whether or not specification information is inserted in the received response message. Since no specification information is inserted in the response message at this time, the specification-information insertion unit 12 detects the server 2a as the source of the response message, and designates the server 2a as a destination server. Then, the first specification-information detection unit 11 generates specification information 4a which uniquely specifies the server 2a as the destination server, inserts the specification information 4a in the response message, and sends the response message to the client 3a.

In the sequence of operations explained above, the response message in which the specification information 4a (enabling unique specification of the server 2a which is set as the destination server) is inserted is sent to the client 3a. Then, the client 3a extracts the specification information 4a from the response message, and stores the specification information 4a in the storage (not shown).

When the application (APL-A) 31 performs processing in which the uniqueness is required to be guaranteed, the application (APL-A) 31 reads the specification information stored in the storage, inserts the specification information in a request message which is to be outputted next, and transmits the request message. The specification information inserted in the above request message is indicated by the reference "4b" in FIG. 1. The specification information 4b specifies the destination server (the server 2a) as the opposite party in a session performed for the above processing.

The load-balancing device 1a receives the request message in which the specification information 4b is inserted, and the second specification-information detection unit 13 checks whether or not the request message contains specification information. At this time, the specification information 4b is detected. Therefore, the destination determination unit 14 determines the destination server on the basis of the specification information 4b. Since the specification information 4b specifies the server 2a, the destination determination unit 14 sends the request message to the server 2a, which has performed processing previously. At this time, specification information 4c specifying the server 2a is inserted in the request message.

When the server 2a receives the above request message, the application (APL-A) 21a performs subsequent processing, generates a response message responding to the above request message, and sends the response message to the load-balancing device 1a. At this time, the specification information 4c inserted in the received request message is sent back to the load-balancing device 1a, as it is, as specification information 4d in the above response message.

When the load-balancing device 1a receives the above response message in which the specification information 4d is inserted, and the first specification-information detection unit 11 checks whether or not the response message contains specification information. At this time, the specification information 4d is detected. Therefore, the specification-information insertion unit 12 sends to the client 3a the response message containing the specification information 4d as it is.

As explained above, when a session in a predetermined application is established between the client 3a and the server 2a, the load-balancing device 1a designates the server 2a as a destination server, inserts in a response message the specification information 4a specifying the server 2a, and sends the response message to the client 3a. When it is necessary to guarantee the uniqueness, the client 3a inserts the specification information 4b into the request message, and sends the request message. The load-balancing device 1a necessarily delivers the request message from the client 3a, to the server 2a, on the basis of the specification information 4b. Thus, the uniqueness is guaranteed.

Incidentally, the system of FIG. 1 also comprises the load-balancing device 1b, which is equivalent to the load-balancing device 1a. Therefore, the load-balancing device 1b can also receive a request message from the client 3a. As mentioned above, when it is necessary to guarantee the uniqueness, the client 3a inserts specification information into the request message, and sends the request message. The specification information inserted in the above request message is indicated by the reference "4e" in FIG. 1. When the load-balancing device 1b receives a request message in which specification information 4e is inserted, the load-balancing device 1b detects the specification information 4e, and delivers the request message to the server 2a on the basis of the detected specification information 4e, in a similar manner to the load-balancing device 1a. That is, the load-balancing device 1a and the load-balancing device 1b can determine the destination server on the basis of only the specification information 4e without necessity for the aforementioned management tables which manage destinations, and the load-balancing device 1b can deliver a request message to the server 2a on the basis of the specification information which is set by the load-balancing device 1a.

Even in the case where a further load-balancing device is arranged in the system, when one of the plurality of load-balancing devices sets a destination server, inserts into a response message specification information specifying the destination server, and sends the response message to a client, any of the plurality of load-balancing devices can send a request message received from the client, to the same destination server on the basis of the specification information which is inserted in the response message.

In addition, in some cases, the arrangement for guaranteeing the uniqueness established for the processing in accordance with the application (APL-A) 31 is also required to be used by the client 3a for the processing in accordance with the application (APL-B) 32. In such a case, the specification information is passed from the application (APL-A) 31 to the application (APL-B) 32. The specification information passed from the application (APL-A) 31 to the application (APL-B) 32 is indicated by the reference "4f" in FIG. 1. When it is necessary to guarantee the uniqueness, the application (APL-B) 32 in the client 3a inserts the specification information 4f into a request message, and sends the request message. In this case, the load-balancing device 1a or 1b delivers the request message to the server 2a. Since the load-balancing devices 1a and 1b performs processing for referring to only the specification information 4f, and determining a server specified by the specification information 4f to be the destination server, the load-balancing devices 1a and 1b deliver request messages containing identical specification information 4f to the same server on the basis of the identical specification information 4f even when the services (types of applications) are different.

As explained above, even in the case where a plurality of load-balancing devices are arranged, or even in the case where processing is performed over a plurality of services, it is possible to guarantee the uniqueness between a client and a server.

Client-Server System

Hereinbelow, the embodiment of the present invention is explained in detail with reference to the drawings. In the following embodiment, the present invention is applied to a client-server system which performs processing of a web-based application.

Figure 2:
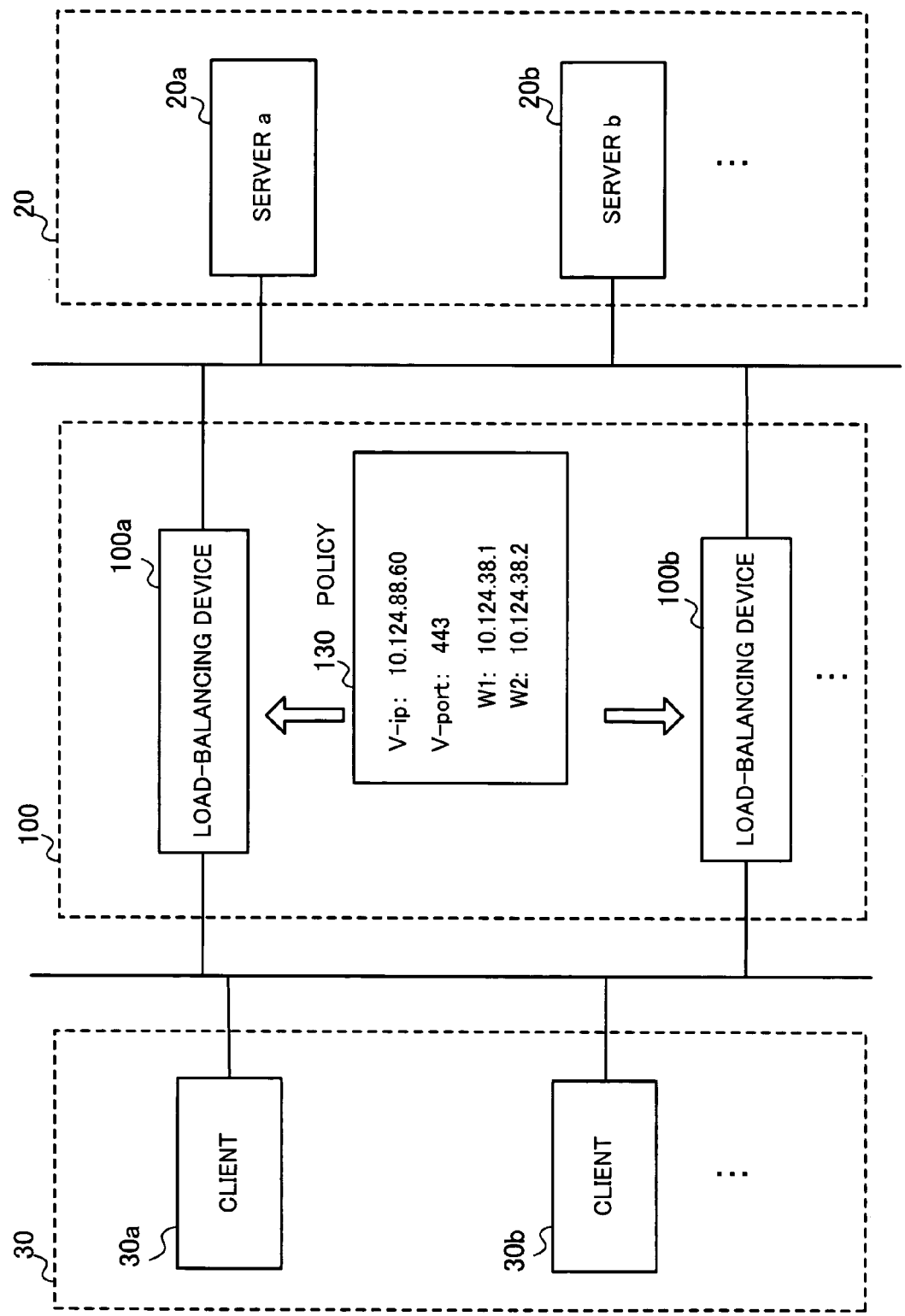
FIG. 2 is a block diagram illustrating a configuration of a load-balancing system according to the embodiment of the present invention.

FIG. 2 is a block diagram illustrating a configuration of a load-balancing system according to the embodiment of the present invention.

In the load-balancing system according to the present embodiment, a server group 20 and a client group 30 are connected through a load-balancing-device group 100.

The client group 30 includes clients 30a, 30b, . . . , and acquires, from web servers in the server group 20, files of HTML documents and images, sounds, and moving images associated with the documents, by using the http (HyperText Transfer Protocol) and the https (HyperText Transfer Protocol Security). The server group 20 includes the server a (20a), the server b (20b), . . . , which are web servers processing requests from the clients which occur irregularly.

The load-balancing-device group 100 includes load-balancing devices 100a, 100b, . . . , which deliver request messages from the clients, to optimum servers on the basis of a policy 130 registered in advance in order to balance loads imposed on the servers. In the policy 130, a virtual IP address (V-ip), a virtual port, and the like of the server group 20 and IP addresses of the servers in the server group 20 are registered. For example, in the example of FIG. 2, the IP address W1 (=10.124.38.1) of the server a (20a) and the IP address W2 (=10.124.38.2) of the server b (20b) are registered. In addition, procedures for load balancing and the like are also registered.

Hardware Construction

Figure 3:
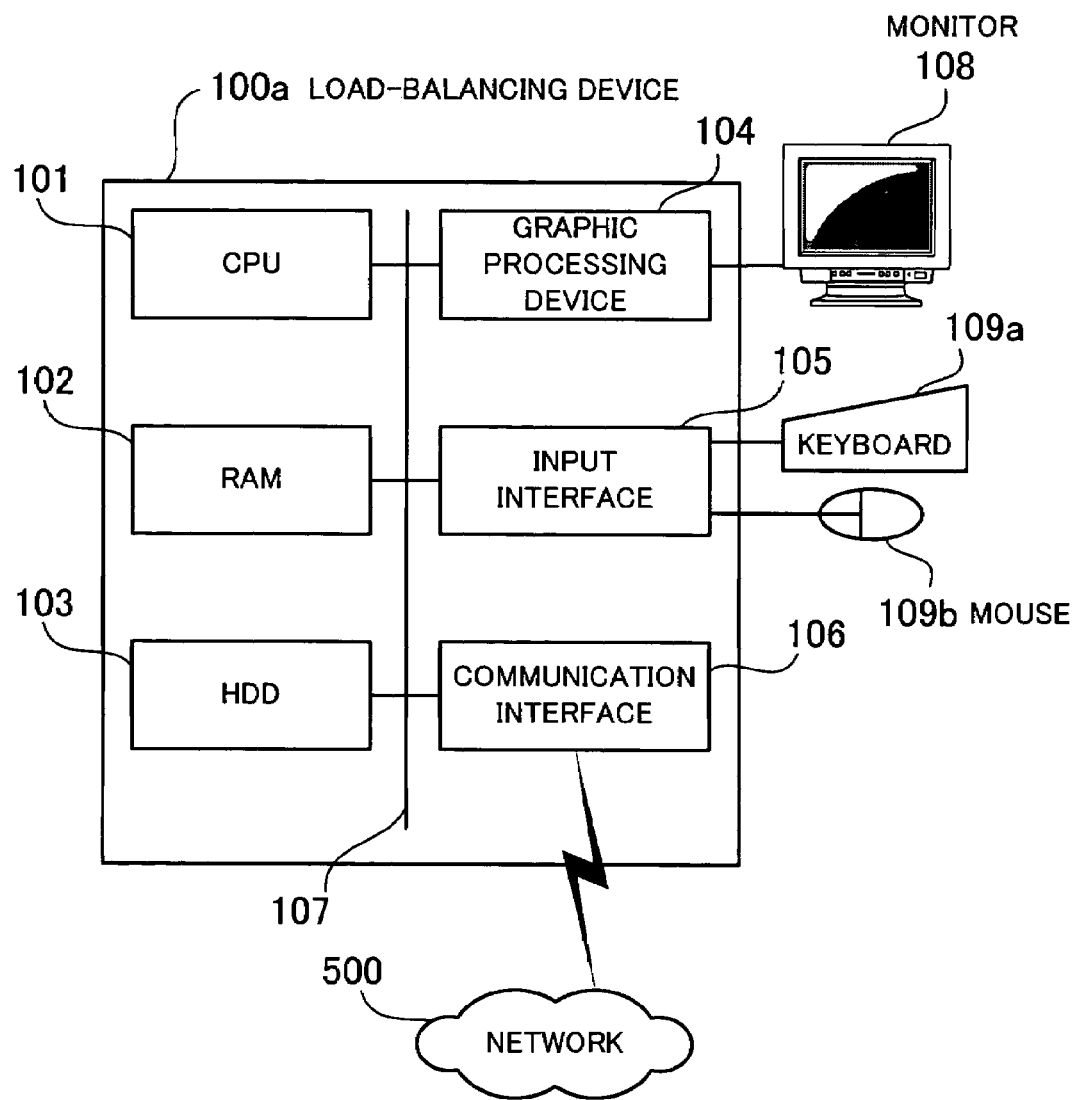
FIG. 3 is a diagram illustrating an example of a hardware construction of a load-balancing device in the embodiment of the present invention.

Next, the hardware construction of the load-balancing device 100a is explained with reference to FIG. 3, which is a diagram illustrating an example of the hardware construction of the load-balancing device. The entire load-balancing device 100a is controlled by a CPU (central processing unit) 101, to which a RAM (random access memory) 102, an HDD (hard disk drive) 103, a graphic processing device 104, an input interface 105, and a communication interface 106 are connected through a bus 107.

The RAM 102 temporarily stores at least portions of an OS (operating system) program and application programs which are executed by the CPU 101, as well as various types of data necessary for processing by the CPU 101. The HDD 103 stores the OS and the application programs.

A monitor 108 is connected to the graphic processing device 104, which makes the monitor 108 display an image on a screen in accordance with an instruction from the CPU 101. A keyboard 109a and a mouse 109b are connected to the input interface 105, which transmits signals sent from the keyboard 109a and the mouse 109b, to the CPU 101 through the bus 107.

The communication interface 106 is connected to the network 500. The communication interface 106 is provided for exchanging data with the clients and the servers through the network 500.

By using the above hardware construction, it is possible to realize processing functions in the embodiment of the present invention. Although the monitor 108, the keyboard 109a, and the mouse 109b are directly connected to the load-balancing device 100a in the construction of FIG. 3, alternatively, it is possible to indirectly connect the load-balancing device 100a through the network 500 with another device having a monitor, a keyboard, and a mouse. In this case, the load-balancing device 110*a* acquires through the network 500 an instruction inputted from the keyboard and the mouse belonging to the other device, performs processing, and displays a result of the processing output through the network 500 on the monitor belonging to the other device. Further, each of the other load-balancing device 100*b*, the servers, and the clients can also have a hardware construction similar to the load-balancing device 100*a*.

Software Realizing the System

In the http protocol, which is used for processing in web-based applications, the cookie is used for guaranteeing the uniqueness. The cookie is specified, for example, in RFC (Request For Comments) 2965 and the like.

The cookie appears in the http header. Every time a cookie is returned from a server to a client, the client stores the cookie. When it is necessary to guarantee the uniqueness, i.e., when access to an identical server or URL is required, an identical cookie is necessarily sent. In addition to the setting of a cookie by a server, an insertion mode in which new cookie information is inserted by a load-balancing device or the like into a response message to be sent from a server to a client is specified.

According to the present embodiment, cookie information is used, i.e., the specification information specifying the destination server is embedded in the cookie information so that the specification information is sent between the clients, the load-balancing devices, and the servers, where information which can be converted into the IP address of the destination server is generated as the specification information.

The arrangement for cookie processing for guaranteeing the uniqueness is already provided in the clients and the servers. Therefore, it is advantageous in that the present embodiment can be realized in the conventional client-server system by updating a load-balancing program for the load-balancing device.

Hereinbelow, the software structure according to the present embodiment is explained.

Figure 4:
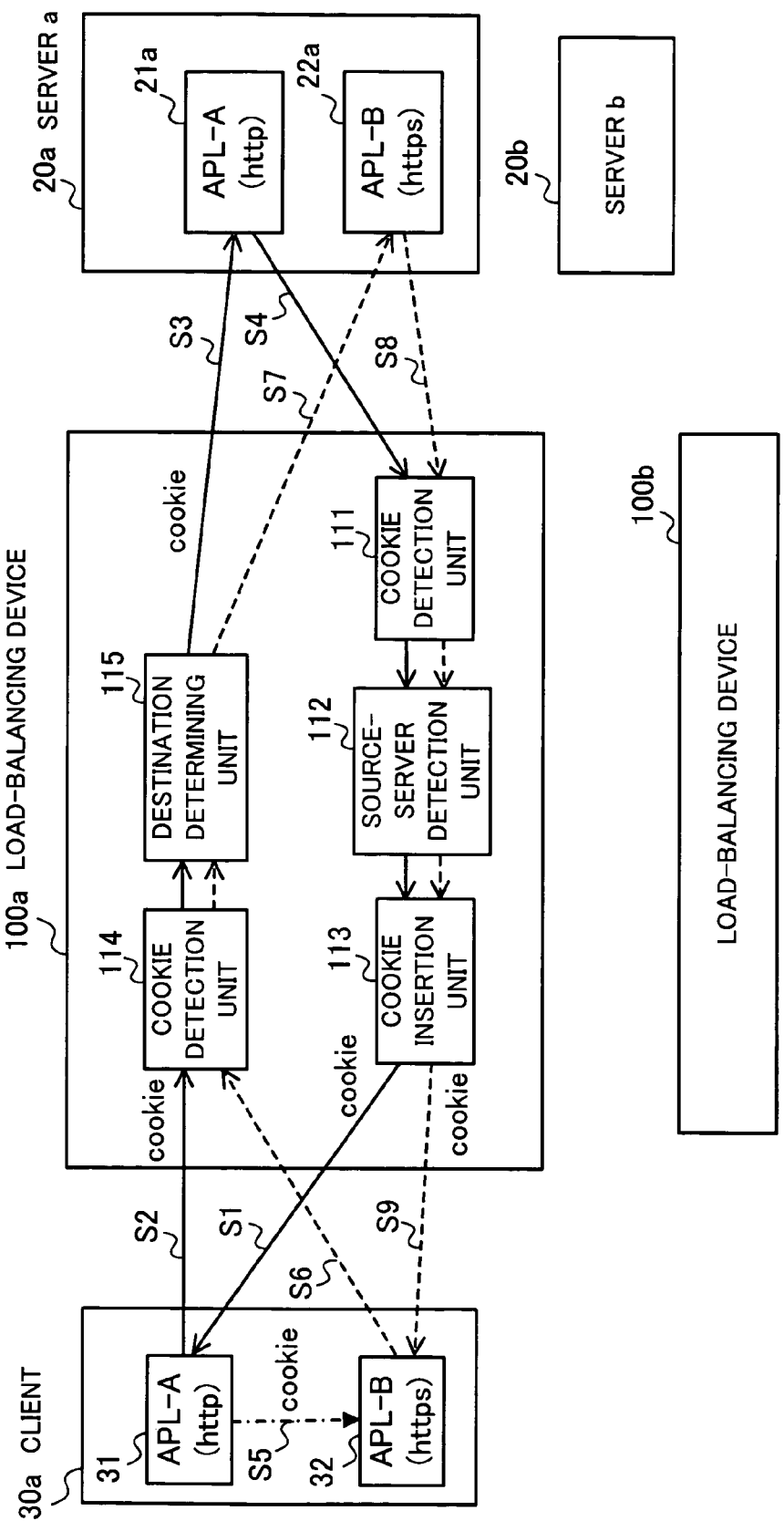
FIG. 4 is a block diagram illustrating software structures of the respective devices in the embodiment of the present invention.

FIG. 4 is a block diagram illustrating software structures of the respective devices in the embodiment of the present invention. In FIG. 4, the same devices as FIG. 2 bear the same reference numbers as FIG. 2, and the explanations of such devices are not repeated. In addition, FIG. 4 shows software structures of only the client 30*a*, the load-balancing device 100*a*, and the server a (20*a*) as representatives of the clients in the client group 30, the load-balancing devices in the load-balancing-device group 100, and the servers in the server group 20.

The client 30*a* has the application (APL-A) 31 and the application (APL-B) 32, where the application (APL-A) 31 performs http processing, and the application (APL-B) 32 performs https processing. The client 30*a* has a cookie function of storing a cookie inserted in a response message sent to the client 30*a*, and necessarily inserting the same cookie in a request message and sending the request message toward the client 30*a* when it is necessary to guarantee the uniqueness. In correspondence with the application (APL-A) 31 and the application (APL-B) 32 in the client 30*a*, the server a (20*a*) has the application (APL-A) 21*a* and the application (APL-B) 22*a*. The server a (20*a*) also has a cookie function of maintaining a session by use of a cookie and transferring cookie information inserted by a load-balancing device, as it is, when it is necessary to identify a client at the application level.

The load-balancing device 100*a* comprises a cookie detection unit 111, a source-server detection unit 112, a cookie insertion unit 113, a cookie detection unit 114, and a destination determining unit 115.

The cookie detection unit 111 detects whether or not a cookie which contains specification information specifying a destination server is inserted in a header of a response message received from a server. The source-server detection unit 112 detects an IP address of the source server of the response message when the cookie detection unit 111 does not detect the cookie. The IP address is detected by referring to the source address of the received response message, information generated by the destination determining unit 115 when the destination server is determined, or other information. The source server can be uniquely determined on the basis of the IP address. The cookie insertion unit 113 sets as the destination server the source server detected by the source-server detection unit 112, and generates specification information which can be converted into the IP address of the source server, on the basis of the IP address of the source server. The IP address per se, or information converted from the IP address (e.g., an encrypted IP address) can be set as the specification information. Alternatively, since the load-balancing device 100*a* holds the policy 130 as indicated in FIG. 2 (which is common to all the load-balancing devices in the load-balancing-device group 100), the load-balancing device 100*a* can set information indicating an IP address of a server which is under control of the load-balancing device 100*a*. The load-balancing device 100*a* embeds the generated specification information in a cookie, and inserts the cookie in a response message in accordance with a specification of the cookie. Then, the response message in which the cookie information is inserted is returned to the client which has sent the request message.

The cookie detection unit 114 detects whether or not a cookie is contained in the header of a request message received from a client. When the cookie detection unit 114 detects the cookie, the destination determining unit 115 delivers the response message to a server specified by the specification information contained in the cookie. When the cookie detection unit 114 does not detect the cookie, the destination determining unit 115 delivers the response message to an optimum server in accordance with a delivery rule, which is set in the policy 130.

The operations of the load-balancing device having the above software structure are explained below. In FIG. 4, the solid arrows indicate flows of the cookie for the application APL-A, and the dashed arrows indicate flows of the cookie for the application APL-B.

No cookie is set in the request message which is first sent from the application (APL-A) 31 in the client 30*a*, and the load-balancing device 100*a* delivers the request message to the server a (20*a*) in accordance with the policy 130.

When the load-balancing device 100*a* receives a response message from the server a (20*a*), the cookie detection unit 111 searches for a cookie, and does not detect a cookie. Therefore, the source-server detection unit 112 detects the real IP address of the server a (20*a*), which is the source server of the response message. The cookie insertion unit 113 sets the detected source server as a destination server, and generates specification information specifying the destination server. In this example, the real IP address of the server a (20*a*) (e.g., "10.124.38.1") or information which can be converted into the real IP address is set as the cookie information. For example, the Set-Cookie command has the following format.

Set-Cookie: Version="version No."; Name=VALUE; path=PATH; . . .

In this example, a Set-Cookie command in which the parameter "Name" is set to "FJXXXIDX" and the parameter "VALUE" is set to "10.124.38.1" is issued, and the cookie is inserted in the header of the response message. Then, the response message having the header in which the above cookie information is inserted is sent to the client 30a in step S1.

When the client 30a receives the above response message, the client 30a stores the cookie information. Thereafter, when it is necessary to guarantee the uniqueness, the client 30a attaches the following header to a request message.

Cookie: Version="version No."; Name=VALUE;
path=PATH; . . .

In the above header, the parameter "Name" is set to "FJXXXIDX," and the parameter "VALUE" is set to "10.124.38.1". Then, the above request message is sent toward the server in step S2.

When the load-balancing device 100a receives the above request message, the cookie detection unit 114 detects the cookie. The destination determining unit 115 determines the server a (20a) to be the destination server on the basis of the specification information ("FJXXXIDX=10.124.38.1") which is set in the cookie and contains the IP address, and sends the request message, as it is, to the server a (20a) in step S3.

In the following explanations, a region of the header which is occupied by the cookie information is referred to as a cookie header.

The server a (20a) receives the above request message, generates a response message having a header containing a cookie header which is identical to the cookie header contained in the received request message, and sends the response message toward the client in step S4. Since the cookie detection unit 111 in the load-balancing device 100a detects the cookie, the source-server detection unit 112 and the cookie insertion unit 113 do not perform processing of the response message, and simply transfers the response message to the client 30a. Thus, the response message containing the cookie header which is identical to the cookie header contained in the request message sent in step S1 is sent to the client 30a.

Thereafter, request messages and response messages can be sent between the application (APL-A) 31 in the client 30a and the application (APL-A) 21a in the server a (20a) in the manner explained above. That is, the uniqueness between the application (APL-A) 31 in the client 30a and the application (APL-A) 21a in the server a (20a) is guaranteed. In addition, even when the load-balancing device 100b, instead of the load-balancing device 100a, receives the request message, the device 100b can deliver the request message to the server a (20a) on the basis of specification information indicating the IP address of the server a (20a) and being set in the cookie header.

Further, in the case where the uniqueness is guaranteed across the application (APL-A) 31 and the application (APL-B) 32, the cookie used for the application (APL-A) 31 is passed to the application (APL-B) 32 in step S5, and the same cookie header used for the application (APL-A) 31 is also inserted into request messages in accordance with the application (APL-B) 32 when the request messages are transmitted in step S6.

Since the load-balancing device 100a determines the destination of each request message on the basis of only the specification information set in the cookie, the request message in accordance with the application (APL-B) 32 is handled by the load-balancing device 100a in a similar manner to the request message in accordance with the application (APL-A) 31, so that the request message in accordance with the application (APL-B) 32 is sent to the application (APL-B) 22a in the server a (20a) in step S7. In this case, the cookie in the request message is sent again to the load-balancing device 100a in step S8, and is then sent from the load-balancing device 100a to the client 30a in step S9.

Thereafter, request messages and response messages can be sent between the application (APL-B) 32 in the client 30a and the application (APL-B) 22a in the server a (20a) in the manner explained above. That is, the uniqueness between the application (APL-B) 32 in the client 30a and the application (APL-B) 22a in the server a (20a) is guaranteed, after the uniqueness between the application (APL-A) 31 in the client 30a and the application (APL-A) 21a in the server a (20a) is guaranteed. In addition, even when the load-balancing device 100b, instead of the load-balancing device 100a, receives the request message in accordance with the application APL-B, the uniqueness is guaranteed as in the case of the application APL-A.

Next, a sequence of processing for guaranteeing the uniqueness in each load-balancing device is explained below.

Figure 5:
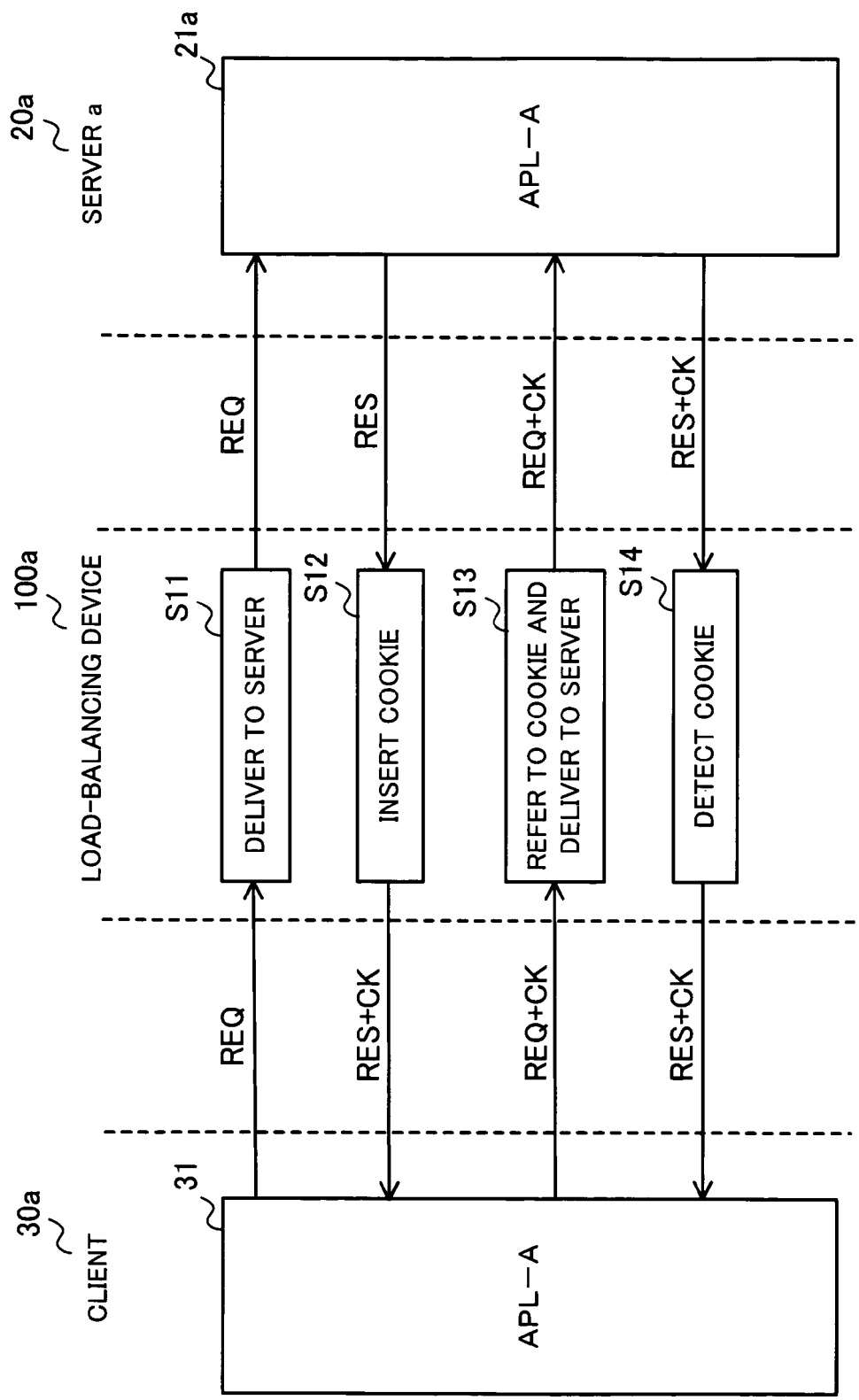
FIG. 5 is a diagram illustrating a sequence of processing performed by each load-balancing device for guaranteeing the uniqueness.

FIG. 5 is a diagram illustrating a sequence of processing performed by the load-balancing device for guaranteeing the uniqueness. In FIG. 5, the same elements as FIG. 4 are indicated by the same reference numbers as FIG. 4, and the explanations of such elements are not repeated. In the following explanations, the cookie (CK) means cookie information containing specification information which is set by the load-balancing device 100a or 100b and specifies a destination server, and the cookie (CK) does not mean a cookie which is set by a server for maintaining the uniqueness at the application level.

First, the application (APL-A) 31 in the client 30a sends a request message (REQ). The load-balancing device 100a receives the request message, and determines whether or not the request message (REQ) contains a cookie (CK). Since no cookie is contained in the request message (REQ) at this time, the load-balancing device 100a performs processing for delivering the request message (REQ) to an optimum server in step S11. Specifically, the load-balancing device 100a determines an optimum server to be the destination, and sends the request message (REQ) to the destination. In the example of FIG. 5, the server a (20a) is determined to be the destination server.

The server a (20a) receives the request message (REQ), performs processing in accordance with the application (APL-A) 21a, and sends a response message (RES) toward the client 30a. In addition, when cookie information for specifying the client 30a is necessary at the application level, it is possible to set cookie information which is to be used by the application (APL-A) 21a.

The load-balancing device 100a receives the response message (RES), and determines whether or not a cookie (CK) is inserted in the received response message (RES). Since no cookie (CK) is detected at this time, the load-balancing device 100a performs processing for inserting a cookie in step S12. In this processing, it is determined that the source server of the response message (RES) is the server a (20a), and the server a (20a) is set as a destination. Then, information which can be converted into the real IP address of the server a (20a) is set in a cookie (CK), a Set-Cookie command is issued, and the cookie (CK) is inserted into the response message, so that a response message (RES+CK) having a cookie is generated. The response message (RES+CK) is sent to the client 30a.

The client 30a receives the response message (RES+CK) having the cookie (CK), and stores the cookie (CK). When it is necessary to guarantee the uniqueness in a subsequent access, the client 30a reads out the stored cookie (CK), inserts the cookie (CK) into a request message so as to produce a request message (REQ+CK) having a cookie, and sends the request message (REQ+CK) to the server.

The load-balancing device 100a receives the request message (REQ+CK) having the cookie, and detects the cookie (CK). Therefore, the load-balancing device 100a performs processing for referring to the cookie (CK) and delivering the request message to a destination server in step S13. Specifically, the load-balancing device 100a determines the server a (20a) to be the destination server on the basis of the specification information embedded in the cookie (CK) which is inserted in the request message, and sends the request message (REQ+CK) having the cookie to the server a (20a).

The server a (20a) receives the request message (REQ+CK) having the cookie, performs processing in accordance with the application (APL-A) 21a, and sends a response message (RES+CK) having the cookie. However, when the request message contains cookie information which is set at the application level, the load-balancing device 100a performs processing by referring to the cookie information set at the application level.

The load-balancing device 100a receives a response message (RES+CK) sent from the server a (20a), and determines whether or not a cookie (CK) is inserted in the received response message. Since the cookie (CK) is detected at this time, the load-balancing device 100a sends to the client 30a the response message (RES+CK) having the cookie (CK), as it is, in step S14.

Thereafter, the processing in steps S13 and S14 is repeatedly performed. Thus, the uniqueness between the application (APL-A) 31 in the server a (20a) and the application (APL-A) 21a in the server a (20a) is guaranteed.

Next, processing for guaranteeing the uniqueness across a plurality of services is explained below.

Figure 6:
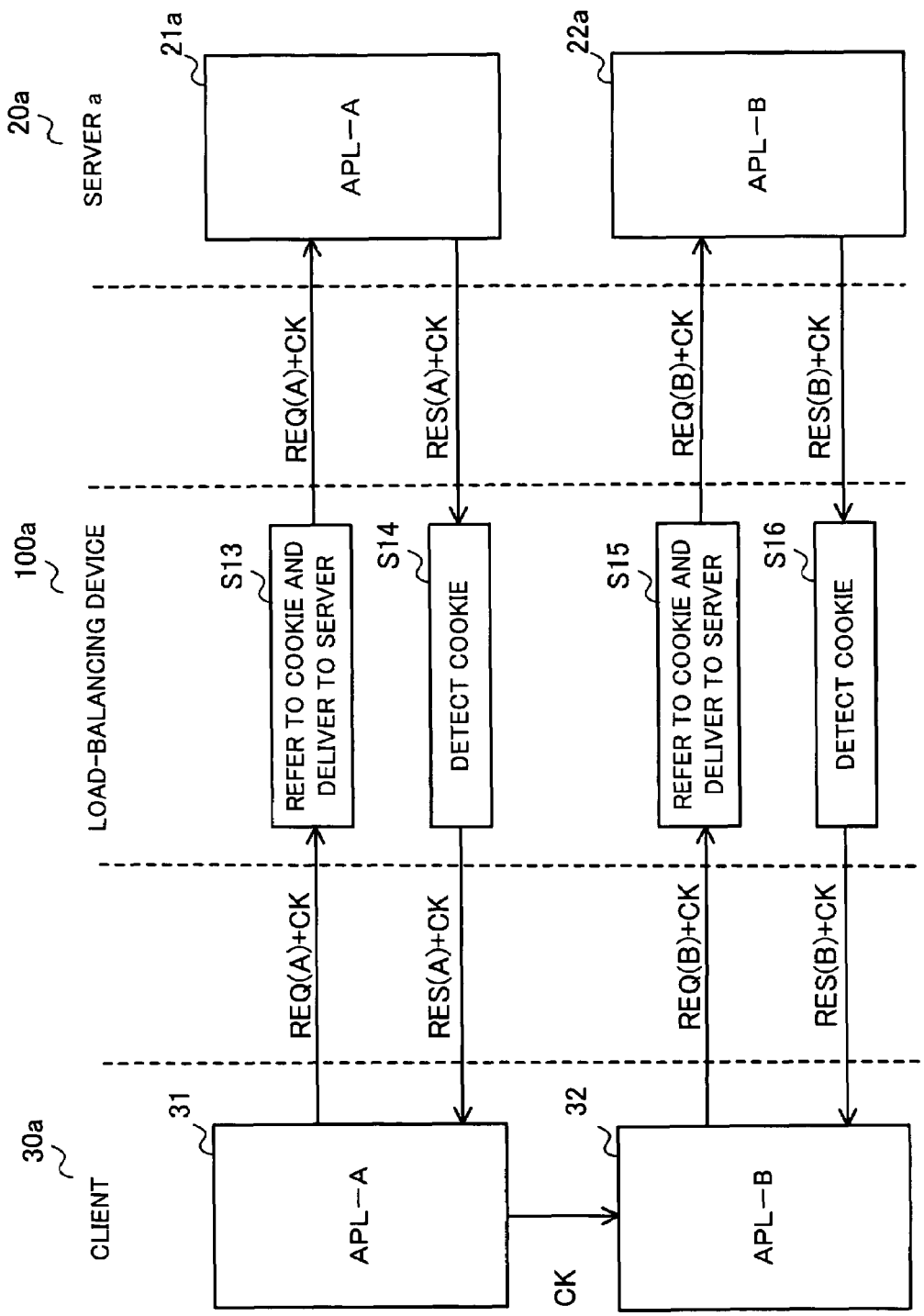
FIG. 6 is a diagram illustrating a sequence of processing performed by the load-balancing device for guaranteeing the uniqueness across a plurality of services.

FIG. 6 is a diagram illustrating a sequence of processing performed by the load-balancing device for guaranteeing the uniqueness across a plurality of services. In FIG. 6, the same elements as FIG. 5 are indicated by the same reference numbers as FIG. 5, and the explanations of such elements are not repeated. However, the request message (REQ+CK) and the response message (RES+CK) in accordance with the application APL-A in FIG. 5 are respectively indicated by the references REQ(A)+CK and RES(A)+CK in FIG. 6.

When a cookie (CK) is passed from the application (APL-A) 31 to the application (APL-B) 32 in the client 30a, the operation transits from the state in which the processing in steps S13 and S14 is repeatedly performed and the uniqueness between the application (APL-A) 31 in the client 30a and the application (APL-A) 21a in the server a (20a) is guaranteed, to another state in which processing in accordance with the application (APL-B) 32 is performed. That is, processing in accordance with the application (APL-B) 32 is started.

First, in processing in accordance with the application (APL-B) 32 in the client 30a, the cookie (CK) is inserted into a request message, and a request message (REQ(B)+CK) is sent in accordance with the application APL-B. That is, the cookie (CK) inserted in the request message (REQ(B)+CK) in accordance with the application APL-B is the same as the cookie (CK) inserted in the request message (REQ(A)+CK) in accordance with the application APL-A.

The load-balancing device 100a receives the request message (REQ(B)+CK), and determines whether or not the request message (REQ(B)+CK) contains a cookie (CK). The load-balancing device 100a performs processing for referring to the cookie (CK) and delivering the request message (REQ (B)+CK) to a destination server in step S15. Specifically, the load-balancing device 100a refers to the cookie (CK), determines the server a (20a) to be a destination on the basis of specification information in the cookie (CK), and sends the request message (REQ(B)+CK) having the cookie (CK), to the server a (20a) as the destination.

The server a (20a) receives the request message (REQ(B)+CK), performs processing of the request message (REQ(B)+CK) in accordance with the application (APL-B) 22a, and sends a response message (RES(B)+CK) having the cookie (CK) toward the client 30a.

The load-balancing device 100a receives the response message (RES(B)+CK), and determines whether or not a cookie (CK) is inserted in the received response message (RES(B)+CK). Since the cookie (CK) is detected at this time, the load-balancing device 100a sends to the client 30a the response message (RES(B)+CK) having a cookie, as it is, in step S16.

As explained above, each load-balancing device determines the destination server by referring to the cookie (CK). Therefore, each load-balancing device delivers request messages having an identical cookie to an identical server even when the request messages are sent for different services. Therefore, it is possible to guarantee the uniqueness across a plurality of services.

In the actual application processing, the uniqueness is guaranteed at the application level by passing some information related to the client 30a, from the application (APL-A) 21a to the application (APL-B) 22a. For example, the application (APL-B) 22a can inherit from the application (APL-A) 21a a cookie generated by the server a (20a). However, even if such a cookie is provided, it is impossible to guarantee the uniqueness across a plurality of services at the application level unless the load-balancing device 100a can surely deliver the request messages to the server a (20a) according to the present embodiment.

Next, processing for guaranteeing the uniqueness in the case where a plurality of load-balancing devices are arranged is explained below.

Figure 7:
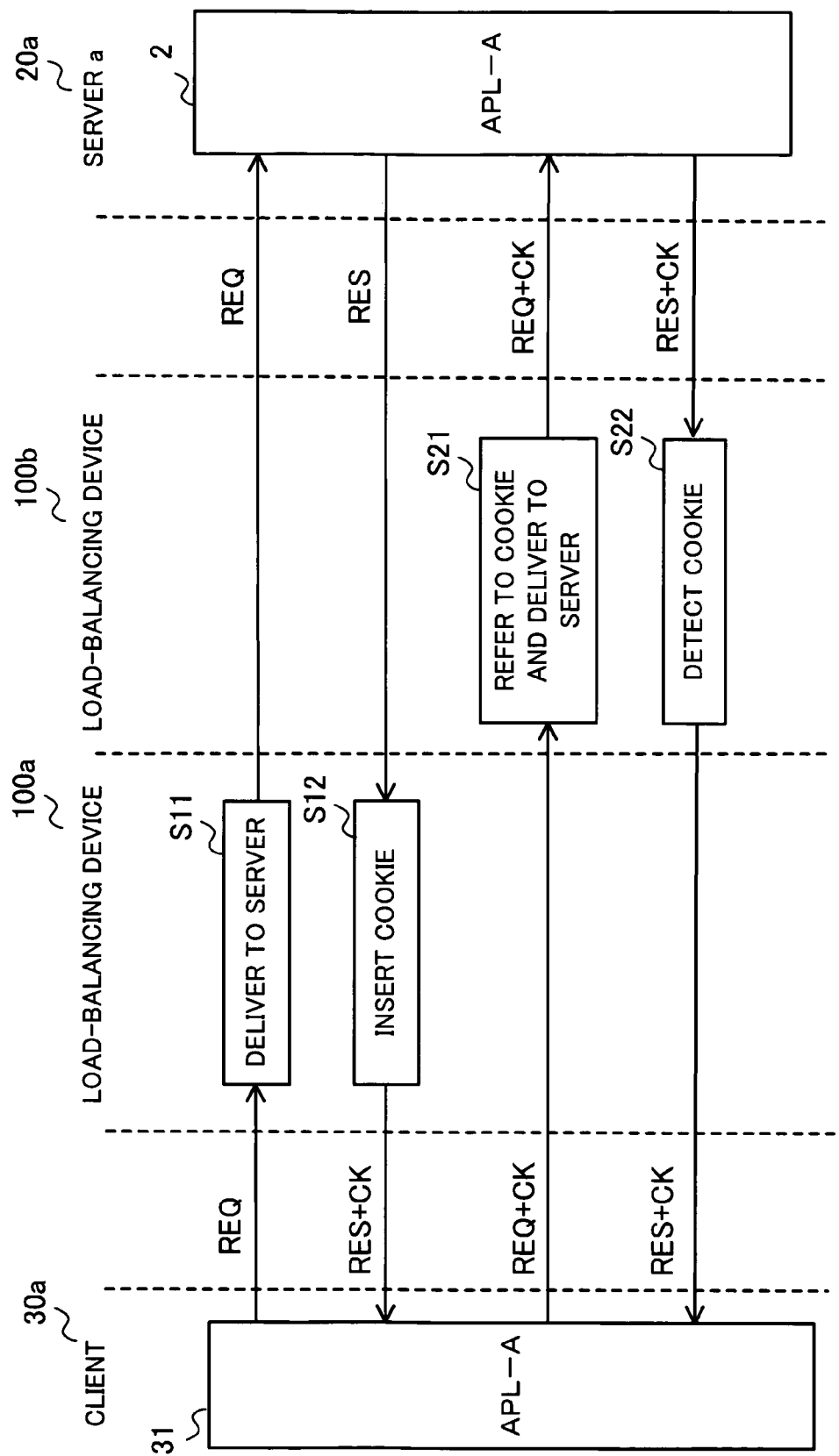
FIG. 7 is a diagram illustrating a sequence of processing performed for guaranteeing the uniqueness in the case where a plurality of load-balancing devices are arranged.
Figure 8:
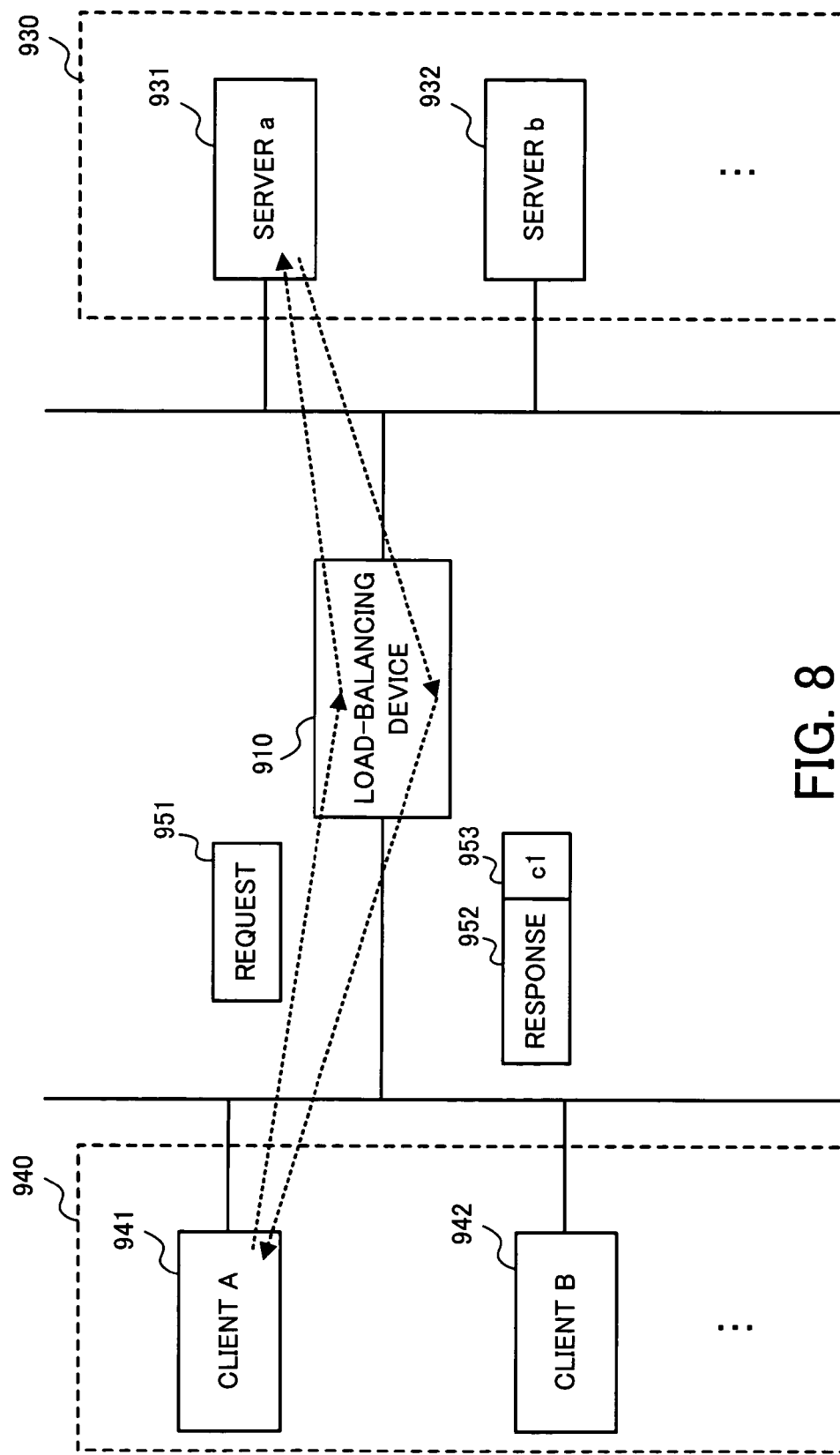
FIG. 8 is a diagram illustrating an example of a configuration of a client-server system having a conventional load-balancing device.
Figure 9:
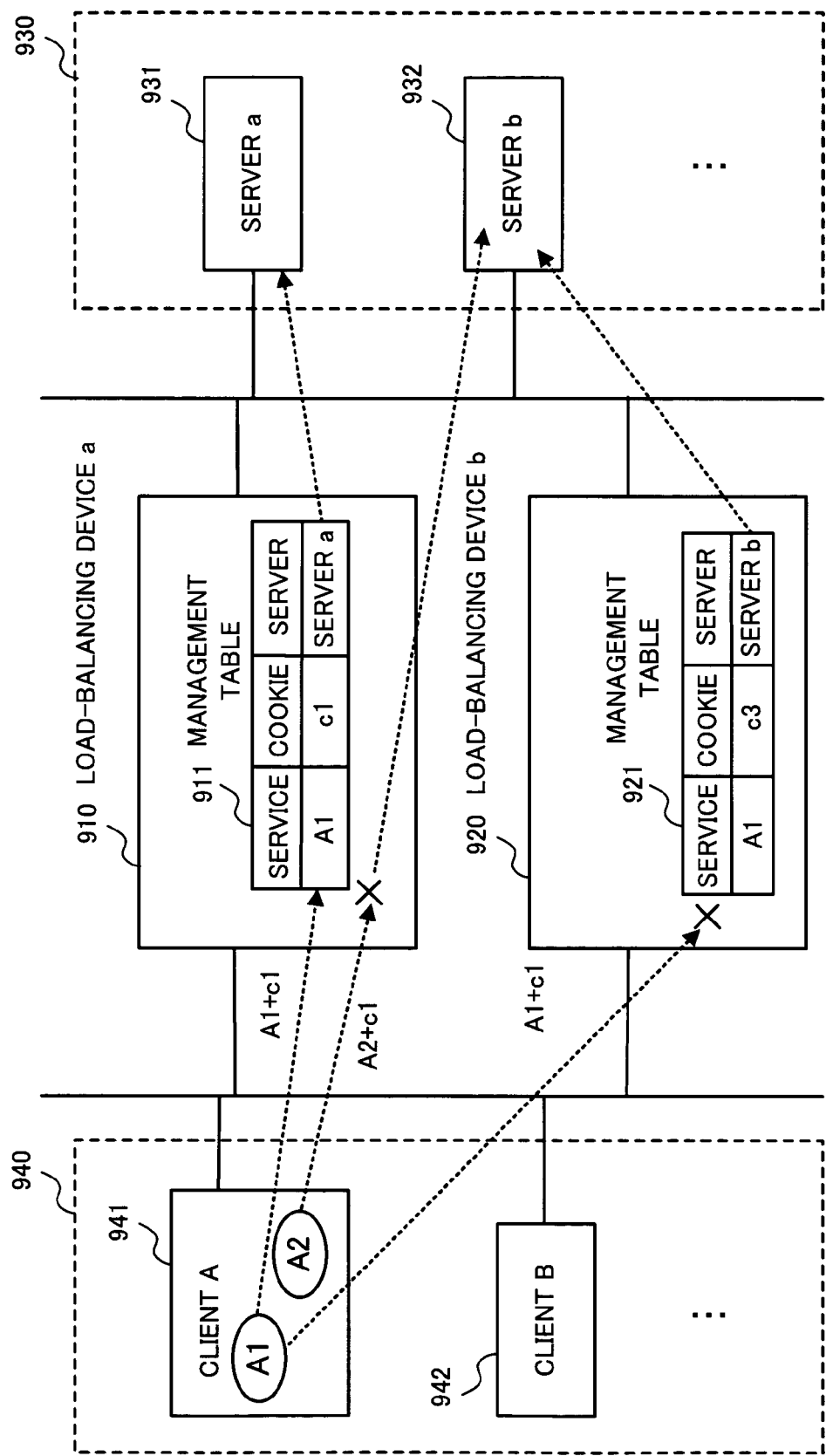
FIG. 9 is a diagram illustrating processing for setting a cookie in a conventional load-balancing device.

FIG. 7 is a diagram illustrating a sequence of processing performed for guaranteeing the uniqueness in the case where a plurality of load-balancing devices are arranged. In FIG. 7, the same elements as FIG. 5 are indicated by the same reference numbers as FIG. 5, and the explanations of such elements are not repeated.

The load-balancing device 100a delivers a request message (REQ) from the client 30a, to the server a (20a) in step S11, and sends a response message (RES+CK) having a cookie (CK) convertible to the IP address of the server a (20a), to the client 30a in step S12.

When the client 30a receives the response message (RES+CK) having the cookie (CK), the client 30a stores the cookie (CK). When it is necessary to guarantee the uniqueness, the client 30a sends a request message (REQ+CK) having the cookie (CK).

When the load-balancing device 100a receives the request message (REQ+CK) having the cookie (CK), the device 100a performs processing for referring to the cookie (CK) and delivering the request message (REQ+CK) in step S21. Specifically, the device 100a refers to the cookie (CK), determines the designated server a (20a) to be the destination server, and sends the request message (REQ+CK) having the cookie (CK) to the destination server. When the load-balancing device 100a receives a response message (RES+CK) sent from the server a (20a), the cookie (CK) is detected. Therefore, the server 100b sends to the client 30a the response message (REQ+CK) having the cookie (CK), as it is, in step S22.

As explained above, the load-balancing device 100a determines the destination server of the request message by referring to the cookie (CK). That is, each load-balancing device can send request messages related to each other to an identical server even when a cookie set by another load-balancing device is used.

Additional Matters

The above processing functions of each load-balancing device can be realized by a computer. In this case, a program (i.e., a load-balancing program) describing details of processing for realizing the functions which the load-balancing device should have is provided. When the computer executes the program, the above processing functions can be realized on the computer.

The program describing the details of the processing can be stored in a recording medium which can be read by the computer. The recording medium may be a magnetic recording device, an optical disk, an optical magnetic recording medium, a semiconductor memory, or the like. The magnetic recording device may be a hard disk drive (HDD), a flexible disk (FD), a magnetic tape, or the like. The optical disk may be a DVD (Digital Versatile Disk), a DVD-RAM (Random Access Memory), a CD-ROM (Compact Disk Read Only Memory), a CD-R (Recordable)/RW (ReWritable), or the like. The optical magnetic recording medium may be an MO (Magneto-Optical Disk) or the like.

In order to put the program into the market, for example, it is possible to sell a portable recording medium such as a DVD or a CD-ROM in which the program is recorded. Alternatively, it is possible to store the program in a storage device belonging to a server computer, and transfer the program to another computer through a network.

The computer which executes the program stores the program in a storage device belonging to the computer, where the program is originally recorded in, for example, a portable recording medium, or is initially transferred from the server computer. The computer reads the program from the storage device, and performs processing in accordance with the program. Alternatively, the computer may directly read the program from the portable recording medium for performing processing in accordance with the program. Further, the computer can sequentially execute processing in accordance with each portion of the program every time the portion of the program is transferred from the server computer.

As explained above, in the load-balancing device according to the present invention, which performs processing in accordance with the load-balancing program according to the present invention, specification information specifying a destination server is inserted in a response message, and the response message is sent to a client. When the load-balancing device receives from the client a request message in which the specification information is inserted, the load-balancing device delivers the request message to the destination server on the basis of the specification information. The specification information is information which enables unique specification of the destination server. The load-balancing device can determine the destination server even when the specification information is set by another load-balancing device. Therefore, even in a system having a plurality of load-balancing devices, when one of the load-balancing devices sets specification information specifying a destination server, the other load-balancing devices can also deliver request messages to the same destination server, on the basis of the specification information. In addition, when a client inserts into a request message specification information common to different services, the plurality of load-balancing devices can also deliver request messages for the different services to the same destination server, on the basis of the specification information. Therefore, when necessary, it is possible to guarantee the uniqueness regardless of the system configuration or service type.

The foregoing is considered as illustrative only of the principle of the present invention. Further, since numerous modifications and changes will readily occur to those skilled in the art, it is not desired to limit the invention to the exact construction and applications shown and described, and accordingly, all suitable modifications and equivalents may be regarded as falling within the scope of the invention in the appended claims and their equivalents.

What is claimed is:

1. A computer-readable recording medium storing a load-balancing program which is executed by a computer and makes the computer realize a load-balancing device for distributing request messages from clients among servers so as to balance loads imposed on the servers, and delivering ones of the request messages related to each other to an identical one of the servers so as to guarantee uniqueness, said load-balancing device comprises:

a first specification-information detection unit which detects whether or not first specification information uniquely specifying a first destination server of a first request message sent from one of the clients to one of the servers is inserted in a predetermined area, other than a source-address area, of a response message responding to the first request message, when said load-balancing device receives the response message from the one of the servers;

a specification-information insertion unit which detects a source server of said response message, designates the source server as said first destination server, generates second specification information uniquely specifying the first destination server, inserts the second specification information into the response message, and sends the response message to said one of the clients, when said first specification-information detection unit detects that said first specification information is not inserted in the first response message;

a second specification-information detection unit which detects whether or not third specification information uniquely specifying a second destination server of a second request message is inserted in the second request message when said load-balancing device receives the second request message from said one of the clients, where the one of the clients stores said first or second specification information inserted in said response message, and inserts the third specification information in the second request message when it is necessary to guarantee the uniqueness; and a destination determination unit which determines the second destination server of said second request message in accordance with a predetermined rule when said second specification-information detection unit detects that the third specification information is not inserted in the second request message, determines said second destination server on the basis of the third specification information when said second specification-information detection unit detects that the third specification information is inserted in the second request message, and sends the second request message to the second destination server.

2. The computer-readable recording medium according to claim 1, wherein said specification-information insertion unit detects a real address of said source server, and generates, as said second specification information, information which is convertible into the real address.

3. The computer-readable recording medium according to claim 2, wherein when said second specification-information detection unit detects that the second specification information is inserted in the second request message, said destination determination unit acquires a real address of said first destination server on the basis of said second specification information, and sends said second request message to said first destination server by using the real address of the first destination server.

4. The computer-readable recording medium according to claim 1, wherein said specification-information insertion unit inserts into a header of the response message the second specification information as cookie information.

5. A load-balancing device for distributing request messages from clients among servers so as to balance loads imposed on the servers, and delivering ones of the request messages related to each other to an identical one of the servers so as to guarantee uniqueness, comprising:

a first specification-information detection unit which detects whether or not first specification information uniquely specifying a first destination server of a first request message sent from one of the clients to one of the servers is inserted in a predetermined area, other than a source-address area, of a response message responding to the first request message, when said load-balancing device receives the response message from the one of the servers;

a specification-information insertion unit which detects a source server of said response message, designates the source server as said first destination server, generates second specification information uniquely specifying the first destination server, inserts the second specification information into the response message, and sends the response message to said one of the clients, when said first specification-information detection unit detects that said first specification information is not inserted in the first response message;

a second specification-information detection unit which detects whether or not third specification information uniquely specifying a second destination server of a second request message is inserted in the second request message when said load-balancing device receives the second request message from said one of the clients, where the one of the clients stores said first or second specification information inserted in said response message, and inserts the third specification information in the second request message when it is necessary to guarantee the uniqueness; and a destination determination unit which determines the second destination server of said second request message in accordance with a predetermined rule when said second specification-information detection unit detects that the third specification information is not inserted in the second request message, determines said second destination server on the basis of the third specification information when said second specification-information detection unit detects that the third specification information is inserted in the second request message, and sends the second request message to the second destination server.

* * * * *